US009264385B2

(12) United States Patent
Kessler et al.

(10) Patent No.: US 9,264,385 B2
(45) Date of Patent: *Feb. 16, 2016

(54) MESSAGING WITH FLEXIBLE TRANSMIT ORDERING

(71) Applicant: CAVIUM, INC., San Jose, CA (US)

(72) Inventors: Richard E. Kessler, Northborough, MA (US); Thomas F. Hummel, Natick, MA (US); Robert A. Sanzone, Hudson, MA (US); Daniel A. Katz, Holliston, MA (US); Michael S. Bertone, Marlborough, MA (US)

(73) Assignee: Cavium, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,674

(22) Filed: Jun. 22, 2015

(65) Prior Publication Data

US 2015/0288625 A1   Oct. 8, 2015

Related U.S. Application Data

(60) Continuation of application No. 14/026,293, filed on Sep. 13, 2013, now Pat. No. 9,065,781, which is a division of application No. 13/326,091, filed on Dec. 14, 2011.

(60) Provisional application No. 61/423,061, filed on Dec. 14, 2010.

(51) Int. Cl.
*H04L 12/28* (2006.01)
*H04L 12/56* (2006.01)
*H04L 12/861* (2013.01)

(Continued)

(52) U.S. Cl.
CPC ............ *H04L 49/9057* (2013.01); *H04L 45/74* (2013.01); *H04L 49/3072* (2013.01); *H04L 49/552* (2013.01); *H04L 69/22* (2013.01)

(58) Field of Classification Search
CPC ..... H04L 65/80; H04L 1/1874; H04L 69/166; H04W 28/065
See application file for complete search history.

(56) References Cited

U.S. PATENT DOCUMENTS 6,009,094 A * 12/1999 Morioka ................. H04L 29/06
370/394
9,065,781 B2   6/2015 Kessler et al.
(Continued)

OTHER PUBLICATIONS

RapidIO—Widipedia, the free encyclopedia, http://en.wikipedia.org/wiki/RapidIO, dated Jul. 19, 2012, pp. 1-3.
(Continued)

*Primary Examiner* — Andrew Chriss
*Assistant Examiner* — Romani Ohri
(74) *Attorney, Agent, or Firm* — Hamilton, Brook, Smith & Reynolds, P.C.

(57) ABSTRACT

In one embodiment, a system includes reassembly stores configured to store a fragment of a packet in a particular reassembly store corresponding with the packet, and when the particular reassembly store contains fragments of the packet representing the packet as a whole, forward the packet to a plurality of cores. The system further includes a packet reception unit configured to store the fragment in one of a plurality of memories within the reassembly stores, and, when the one of the plurality of memories is filled, copy the at least one fragment to a memory external to the packet reception unit.

22 Claims, 13 Drawing Sheets

(51) Int. Cl.
*H04L 29/06* (2006.01)
*H04L 12/741* (2013.01)
*H04L 12/935* (2013.01)
*H04L 12/939* (2013.01)

(56) References Cited

U.S. PATENT DOCUMENTS

| | | |
|---|---|---|
| 2003/0117992 A1 | 6/2003 | Kim et al. |
| 2004/0071127 A1 | 4/2004 | Hurtta |
| 2005/0238054 A1 | 10/2005 | Sharma |
| 2006/0029102 A1* | 2/2006 | Abe .................. H04L 47/34 370/474 |
| 2006/0106946 A1* | 5/2006 | Agarwal ............. H04L 69/16 709/250 |
| 2007/0153818 A1* | 7/2007 | Lakshmanamurthy . H04L 49/90 370/412 |
| 2009/0110003 A1* | 4/2009 | Julien ................. H04L 49/90 370/476 |
| 2010/0122136 A1 | 5/2010 | Korndewal et al. |

OTHER PUBLICATIONS

Cavium Networks Announces Availability of Higher Performance 1.8GHz Per-core OCTEON® II CN63XX Processor Family, http://www.cavium.com/newsevents_Caviumnetworks_OCTEON_II_CN63XX.html, dated Jul. 19, 2012, pp. 1-2.

MontaVista Announces Support for Cavium Networsk OCTEON II CN68XX, CN67XX and CN63XX Multi-core MIPS64 Processors, http://www.cavium.com/newsevents_MontaVista_PR-OCTEON_II_68XX_Support.html, printed Jul. 19, 2012, pp. 1-2.

\* cited by examiner

MESSAGING WITH FLEXIBLE TRANSMIT ORDERING

RELATED APPLICATION

This application is a continuation application of U.S. patent application Ser. No. 14/026,293 filed on Sep. 13, 2013, which is a divisional application of U.S. patent application Ser. No. 13/326,091 filed on Dec. 14, 2011, which claims the benefit of U.S. Provisional Application No. 61/423,061 filed on Dec. 14, 2010. The entire teachings of the above applications are incorporated herein by reference.

BACKGROUND

Typical network devices can implement packet transfers via various packet interfaces, such as Ethernet interfaces SGMII and XAUI. Packet transfers can also be completed over PCI Express (PCIe), a read/write based interface.

Messaging systems such as Serial Rapid Input Output (S-RIO) divide packets (or messages) into fragments. A source node transmits the fragments over a physical layer of network systems to a destination node. Intermediate nodes may receive and forward the packet to the destination as well. Upon receiving the fragments, the destination reassembles the fragments into the original packet.

S-RIO is a serial, packet-based interconnect protocol. S-RIO is optimized for providing communications among devices in an embedded system. S-RIO is commonly implemented in networking and signal processing applications.

SUMMARY

In one embodiment, a system includes a packet reception unit. The packet reception unit is configured to receive a packet, create a header indicating scheduling of the packet in multiple cores and concatenate the header and the packet. The header is based on the content of the packet.

The system may further include a memory internal to the packet reception unit. The packet reception unit may further be configured to receive multiple packets. The packets may originate from more than one source.

The system may further include multiple reassembly stores. Receiving the packet may further include receiving fragments of the packet, storing the fragments in a particular reassembly store corresponding with the packet, and when the particular reassembly store contains fragments of the packet such that the stored fragments represents the packet as a whole, forwarding the packet to the cores. The particular reassembly store may be allocated to the packet upon receiving a first fragment of the packet. The particular reassembly store may accept other fragments of the packet after receiving the first fragment of the packet. The packet reception unit may further be configured to send a retry message when each of the reassembly stores are unavailable to receive a first of the at least one fragments of the packet. The packet reassembly stores may be stored in a memory internal to the packet reception unit. The packet reception unit may be further configured to, store the at least one fragments in one of a plurality of memories within the reassembly stores, and, when the one of the plurality of memories is filled, copy the at least one fragments to an external memory.

The system may further include a packet allocation unit configured to direct each fragment associated with the packet to the particular reassembly store corresponding with the packet. The system may further include at least one port within the packet reception unit. Each reassembly store may be assigned to one of the ports. The reassembly store assignments to the ports may be configurable to affect quality of service of each of the ports.

The system may further include multiple packet reception units. Each packet reception unit may share the reassembly stores. Each reassembly store may be assigned to one of the packet reception units. The reassembly store assignments to the packet reception units may be configurable to affect quality of service of each of the packet reception units.

In one embodiment, a method includes receiving a packet and creating a header that indicates scheduling of the packet in multiple cores, the header based on the content of the packet, and concatenating the header and the packet. The method may further include receiving at least one fragment of the packet, storing the at least one fragment in a particular one of multiple reassembly stores corresponding with the packet, and forwarding the packet to multiple cores when the particular reassembly store contains at least one fragment of the packet such that the stored at least one fragment represents the packet as a whole.

In one embodiment, a system includes a transmit silo configured to store a multiple fragments of a packet, the fragments having been sent to a destination and the transmit silo having not received an acknowledgement of receipt of the fragments from the destination. The system further includes a restriction verifier coupled with the transmit silo. The restriction verifier is configured to receive the fragments and determine whether the fragments can be sent and stored in the transmit silo.

Determining whether the fragments can be sent and stored in the transmit silo in the restriction verifier may be programmable. The restriction verifier may be programmed based on the restrictions of the destination for receiving out of order fragments or packets. The restrictions may limit a number of outstanding fragments, outstanding packets, outstanding fragments per destination, outstanding packets per destination, outstanding fragments per mailbox of the destination, and outstanding packets per mailbox of the destination.

The system may further include multiple controllers. Each controller may be assigned to at least one transmit silo and at least one restriction verifier. The restrictions of each restriction verifier may limit a number of outstanding packets per controller, outstanding fragments per controller, outstanding packets per destination per controller, outstanding fragments per destination per controller, outstanding packets per mailbox of the destination per controller, and outstanding fragments per mailbox of the destination per controller. The assignments of the transmit silos and the restriction verifiers may be configurable to affect quality of service. The controllers may be configured to divide the packet into the multiple fragments, and attach a header to each fragment. Each header may indicate an order of the fragment and a total number of fragments in the packet.

The transmit silo may be further configured to delete a particular fragment of the packet when the transmit silo has received an acknowledgement of receipt of the particular fragment from the destination.

In one embodiment, a method includes storing multiple fragments of a packet in a transmit silo, the fragments sent to a destination, wherein the transmit silo has not received an acknowledgement of receipt of the fragments from the destination, receiving the fragments, and determining whether the fragments can be sent and stored in the transmit silo. In another embodiment, the method includes dividing the packet into the plurality of fragments and attaching a header to each fragment. Each header indicates an order of the fragment and a total number of fragments in the packet.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

A description of example embodiments of the invention follows.

Figure 1:
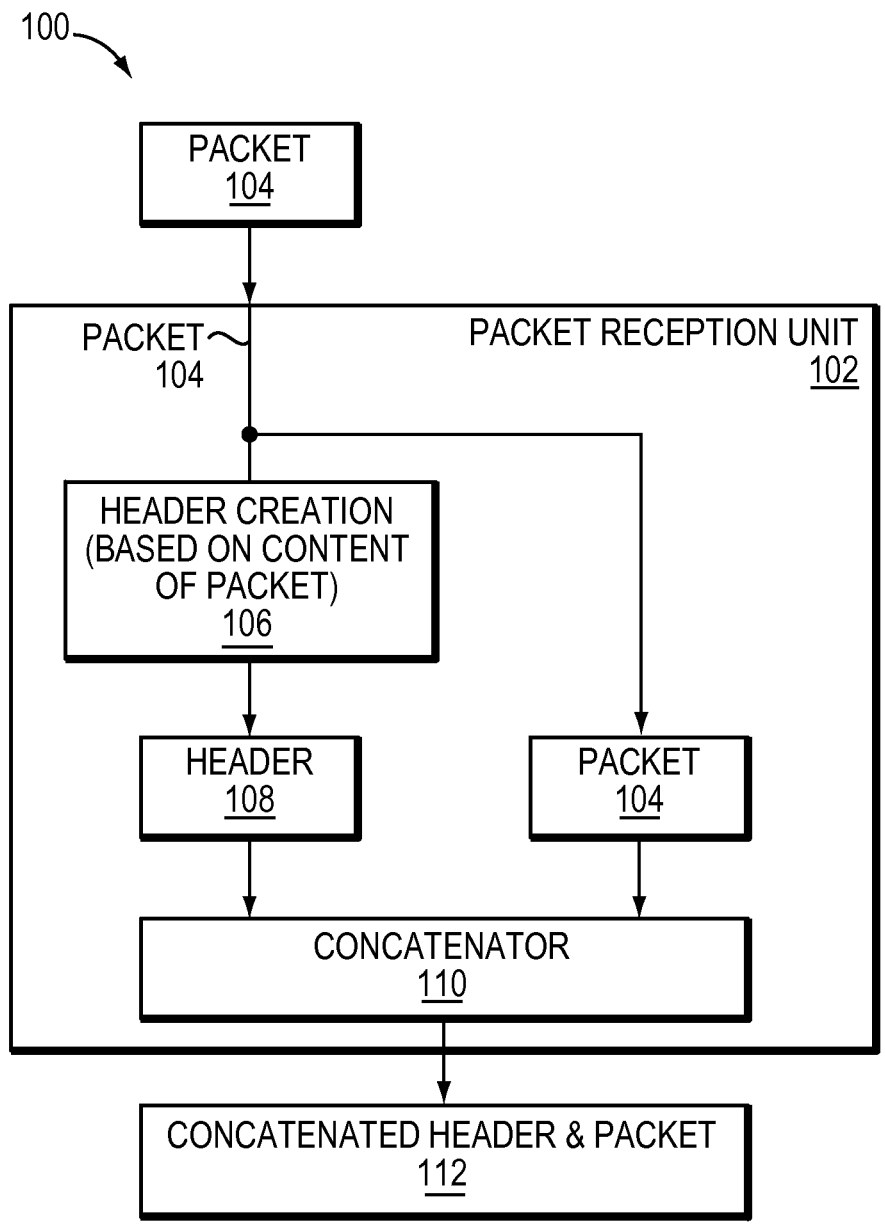
FIG. 1 is a block diagram of a system incorporating a packet reception unit illustrating reception of a packet.

FIG. 1 is a block diagram 100 of a system incorporating a packet reception unit 102 illustrating reception of a packet. The packet reception unit 102 is used in a messaging system. In one embodiment, the messaging system is Serial Rapid Input/Output ("S-RIO"), but other embodiments could use other messaging or network protocols. In another embodiment, the messaging system is based on a multi-source/multi-destination retry protocol. In yet another embodiment, the packet reception unit 102 is a component of a semiconductor chip.

The packet reception unit receives a packet 104 as input and transmits a concatenated header and packet 112 as output. The packet reception unit directs the packet 104 to a header creation module 106. The header creation module creates and outputs a header 108 for the packet 104 which is based on the content of the packet 104 itself. The header 108 includes detailed data about the packet 104, such as its order relative to other packets. The header 108 can further include a standard packet instruction header with critical fields generated from a table lookup. The critical fields can assist scheduling and prioritizing the received packet 104 in a plurality of cores or processors.

In one embodiment, the header 108 can be 16-bytes. The first eight bytes of the header 108 include data specific to the messaging protocol of the packet 104, such as S-RIO. The data in the first eight bytes includes: priority of the packet; an indication of whether a source and destination of the packet are eight or 16 bits; an indication of whether the system is the primary or secondary destination of the packet 104; a size of the packet 104; the source of the packet; a recipient mailbox extension of the packet; a letter field; and a sequence number used to determine the relative order of the packets or doorbells. The second eight bytes of the header 108 include data that allows for generation of quality of service data and scheduling parameters. The system can then schedule processing of the packet based on the data.

A concatenator 110 concatenates the header 108 and the packet 104 to create the concatenated header and packet 112. In one embodiment, the concatenation is a pre-pending of the header 108 to the packet 104. A person of ordinary skill in the art can appreciate that the order of the header 108 and packet 104 and any other intervening data can be adjusted, e.g. the header 108 can be appended to the packet 104 as well.

Figure 2:
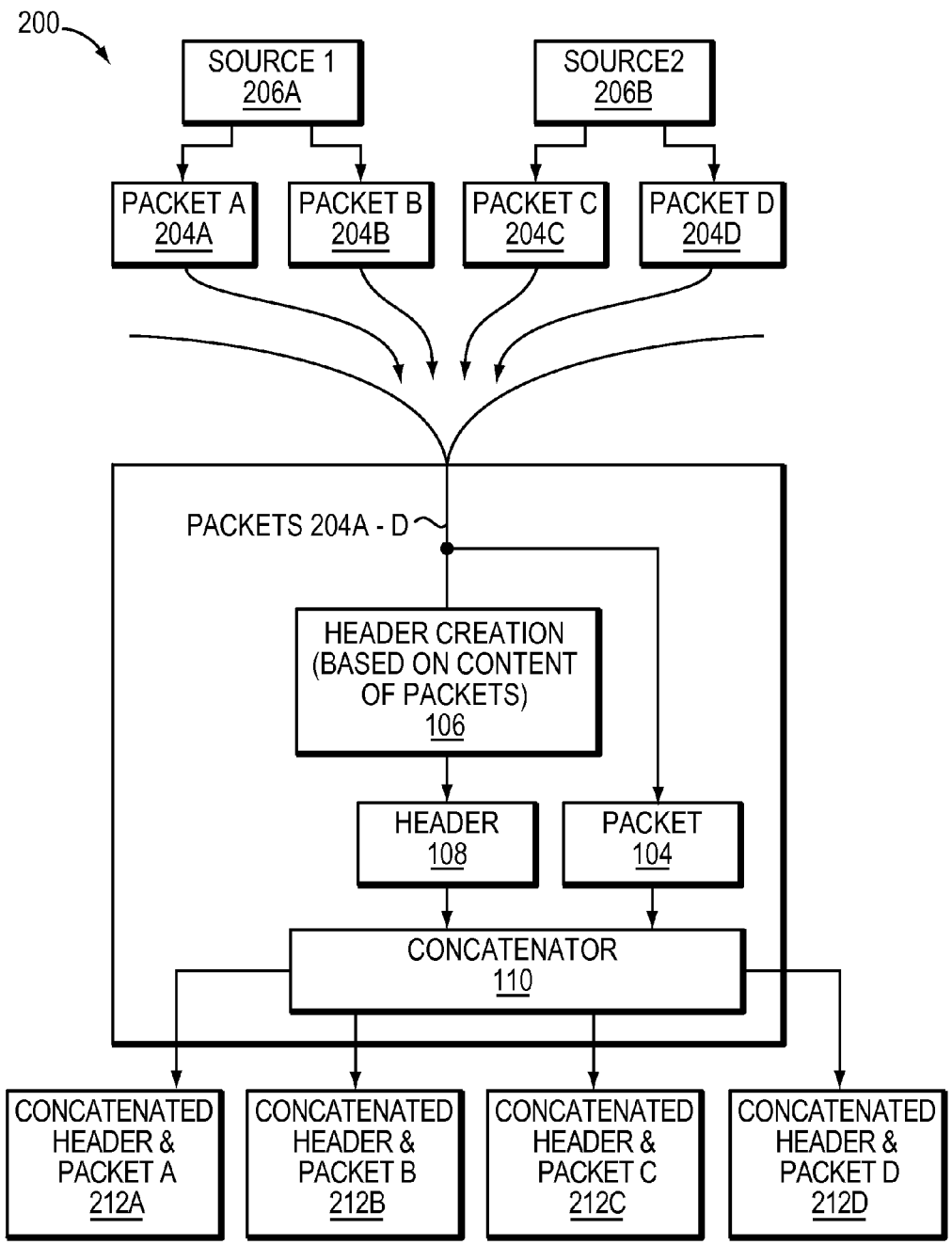
FIG. 2 is a block diagram of a system incorporating a packet reception unit illustrating reception of multiple packets from multiple sources.

FIG. 2 is a block diagram 200 of a system incorporating the packet reception unit 102 illustrating reception of multiple packets from multiple sources. A first source 206A and a second source 206B are configured to transmit packets to the packet reception unit 102. The first source 206A transmits Packet A 204A and Packet B 204B to the packet reception unit 102, and the second source 206B transmits Packet C 204C and Packet N 204D to the packet reception unit 102. A person of ordinary skill in the art can appreciate that the first source 206A and second source 206B are examples of sources, and that any number of sources could send packets to the packet reception unit 102. A person of ordinary skill in the art can also appreciate that a particular source can send multiple packets to the packet reception unit 102.

The packet reception unit 102 then concatenates a header to each of the packets 204A-D, as described in reference to FIG. 1. The packet reception unit 102 then outputs i) concatenated header and packet A 212A corresponding to packet A 204A, ii) concatenated header and packet B 212B corresponding to packet B 204B, iii) concatenated header and packet C 212C corresponding to packet C 204C, and iv) concatenated header and packet N 212D corresponding to packet N. A person of ordinary skill in the art can appreciate that the packet reception unit 102 in FIG. 2 employs the same process for concatenating a header and packet described of the packet reception unit 102 in reference to FIG. 1.

Many messaging systems break packets into smaller fragments. A person of ordinary skill in the art can appreciate that, while the block diagrams of FIGS. 1 and 2 describe the packet reception unit 102 as receiving packets as one unit, the packet reception unit 102 can also receive packets as multiple fragments to be reassembled into a whole packet. FIG. 3A through FIG. 6 illustrate how the fragments can be reassembled into the whole packet.

Figure 3A:
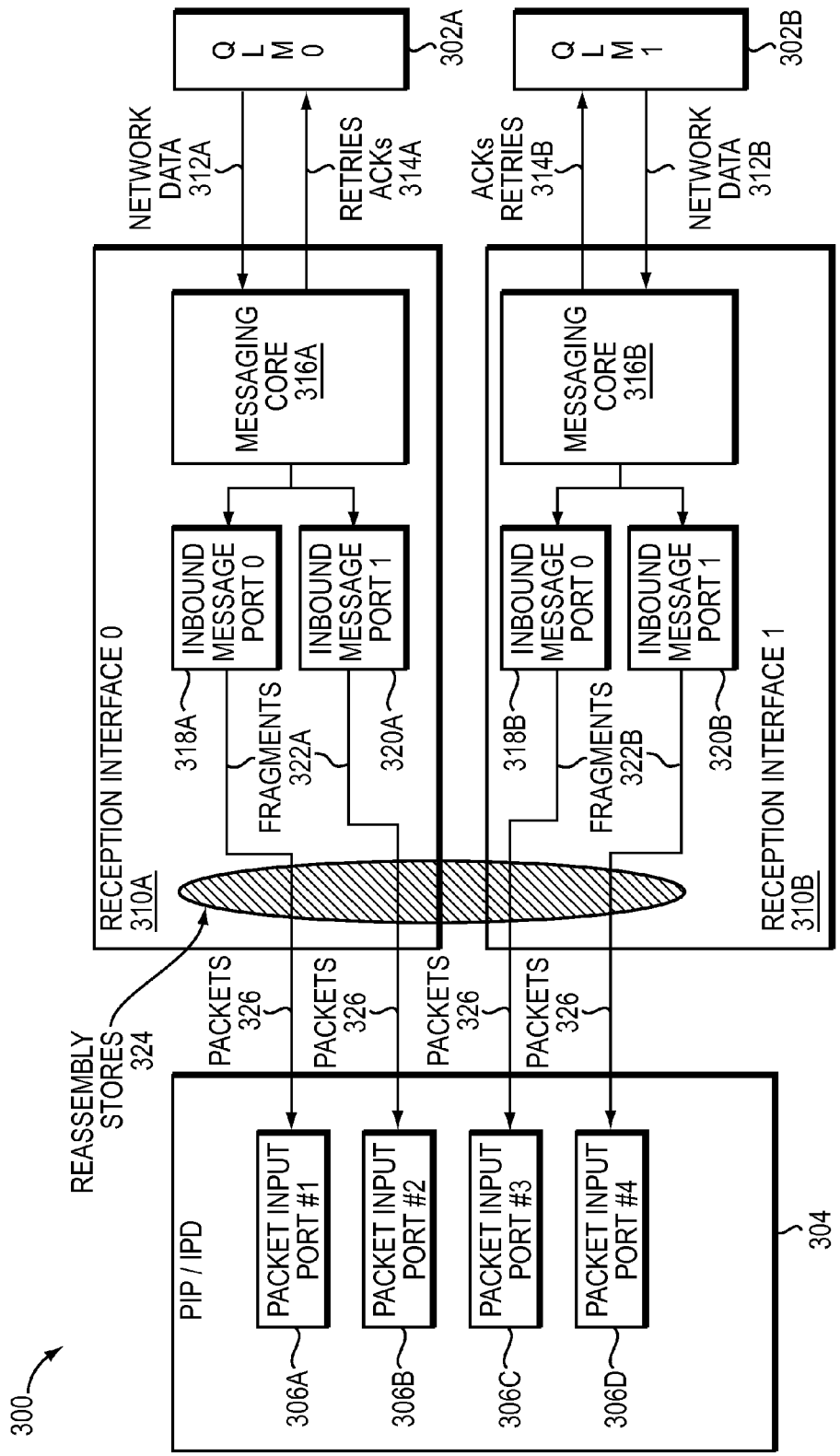
FIG. 3A is a block diagram of a system for receiving packets and directing the packets to a processor.

FIG. 3A is a block diagram 300 of a system for receiving packets and directing the packets to a processor. A first quad-lane module ("QLM") 302A is coupled to a first reception interface 310A. A second QLM is coupled to a second reception interface 310B. Both the first and second reception interfaces 310A-B include similar elements. A person of ordinary skill in the art can apply the description of the first reception interface 310A and the elements incorporated therein recited below to implement analogous elements of the second reception interface 310B.

The first reception interface 310A includes a messaging core 316A. The messaging core 316A receives network data 312A from the first QLM 302A and transmits retries and acknowledgments (ACKs) 314 to the first QLM 302A. The messaging core 316A receives network data 312A including messages, packets, or fragments of a packet. Upon receiving fragments of a packet within the network data 312A from the first QLM 302A, the messaging core 316A determines whether to forward the fragments to the first inbound message port 318A or the second inbound message port 320A. The first or second inbound message port 318A or 320A forwards the fragments 322A to the reassembly stores 324A.

The reassembly stores 324 are a collection of individual reassembly stores. The individual reassembly stores are configured to hold fragments 322A where each reassembly store holds fragments from a particular packet. A fragment, as described above, holds a segment of data from a packet. Likewise, a person of ordinary skill in the art can recognize that a packet is divided into a finite number of fragments. The reassembly stores 324 enable the reception interface 310A to receive fragments from multiple sources and reassemble the fragments into packets.

Upon receiving a fragment, the reception interface directs the fragment to an appropriate reassembly store 324. A packet allocation unit, as discussed later in reference to FIG. 3C and FIGS. 4-6, directs the fragment to the appropriate reassembly store 324. Referring to FIG. 3A, upon a reassembly store 324 receiving all of the fragments that make up the particular packet, the reassembly store 324 outputs packets 326, which includes the particular packet, to a packet input unit 304. In one embodiment, the particular packet is concatenated with the header 108 as described in reference to FIGS. 1 and 2. Referring to FIG. 3A, the packet input unit 304 receives the packets 326, reads the header 108 of the packet 326, and directs the packet 326 to a packet input port 306A-D. The packet input unit 304 directs the packet 326 to a particular packet input port by analyzing the data in the header 108 and determining which port is most desirable for scheduling the work in the packet and managing quality of service of multiple cores in regards to the work within the packet.

Figure 3B:
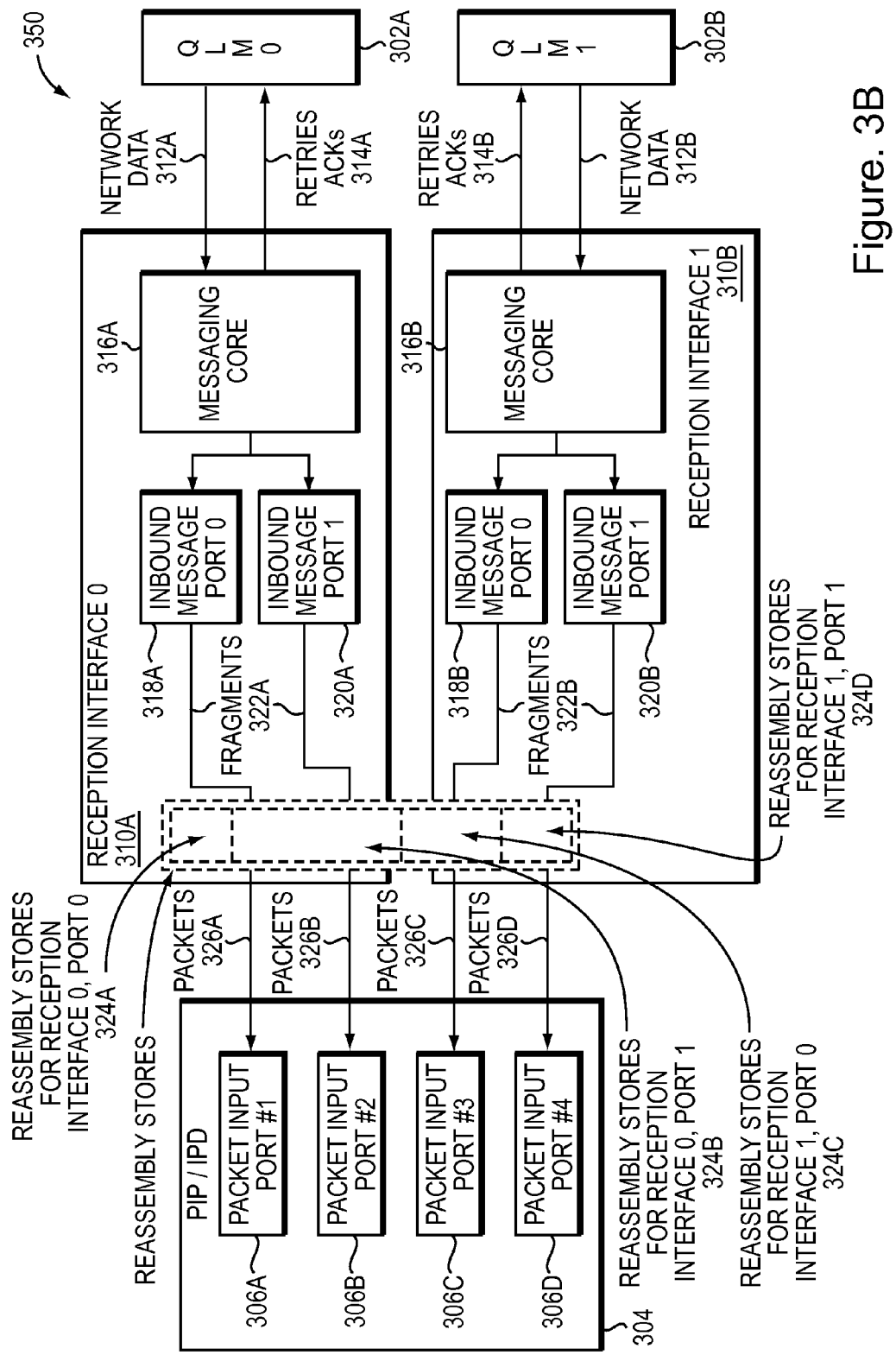
FIG. 3B is a block diagram of a system for receiving packets and directing the packets to a processor.

FIG. 3B is a block diagram 350 of a system for receiving packets and directing the packets to a processor. FIG. 3B is similar to the system described in reference to FIG. 3A, however, the reassembly stores 324A-D, in reference to FIG. 3B, are shared between the reception interfaces 310A-B and the inbound message ports 318A-B and 320A-B. In reference to FIG. 3B, the reassembly stores 324 are partitioned to individual inbound message ports 318A-B and 320A-B across both of the first reception interface 310A and the second reception interface 310B. The first inbound message port 318A of the first reception interface 310A is coupled to output fragments 322A to a first set of reassembly stores 326A. The second inbound message port 320A of the first reception interface 310A is coupled to output fragments 322A to a second set of reassembly stores 326B. The first inbound message port 318B of the second reception interface 310B is coupled to output fragments 322B to a third set of reassembly stores 326B. The second inbound message port 320B of the second reception interface 310B is coupled to output fragments 322A to a fourth set of reassembly stores 326D. The allocation of the sets of reassembly stores 326A-B to the inbound message ports 318A-B and 320A-B are configurable to affect quality of service. Further, FIG. 3B illustrates that the reassembly stores 324A-D are shared across the first and second reception interfaces 310A-B. In one embodiment, the reassembly stores 324A-D are in a memory shared between the first and second reception interfaces 310A-B.

A person of ordinary skill in the art can recognize the system can include any number of reassembly stores 326. In one embodiment, the system includes 46 reassembly stores 326. Each reassembly store 326 has a particular amount of memory. In one embodiment, each reassembly store 326 has 128 bytes of memory. A person of ordinary skill in the art construct reassembly stores 326 with more or less memory.

Figure 3C:
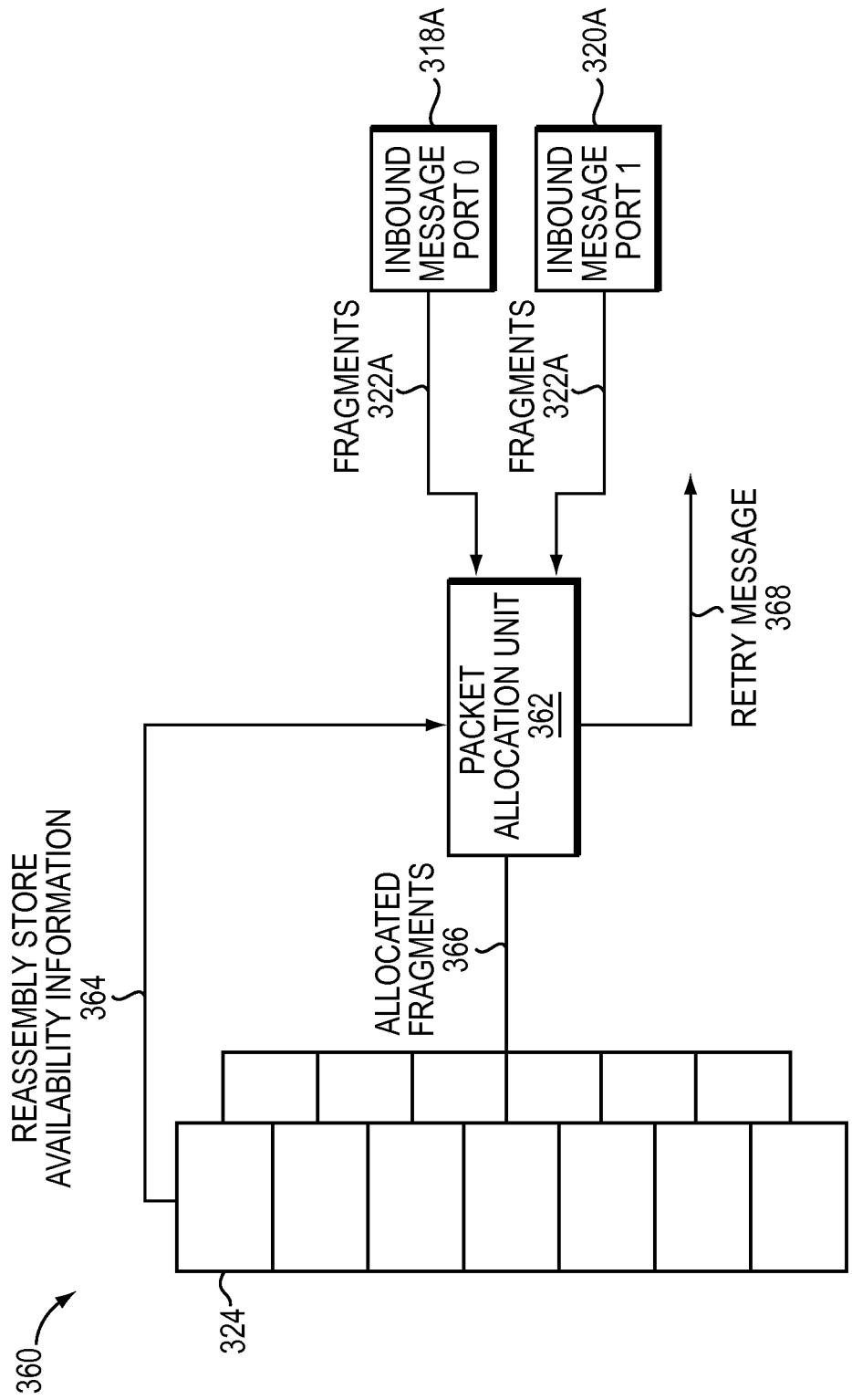
FIG. 3C is a block diagram of a system for receiving fragments for reassembly into a packet.

FIG. 3C is a block diagram 360 of a system for receiving fragments 322A to be reassembled into a packet. FIG. 3C illustrates how a fragment is directed to a particular reassembly store. As described in reference to FIG. 3A, the inbound message ports 318A and 320A output fragments 322A to a packet allocation unit 362. The packet allocation unit 362 receives reassembly store availability information 364 and determines whether to store the fragment in one of the reassembly stores 324. If the packet allocation unit 362 determines a reassembly store is available, it sends an allocated fragment 366 to the reassembly stores 324. If the packet allocation unit 362 determines a reassembly store is not available, it generates a retry message 368 which is sent to the source of the fragment 322A, so that the source can resend the fragment 322A.

Figure 4:
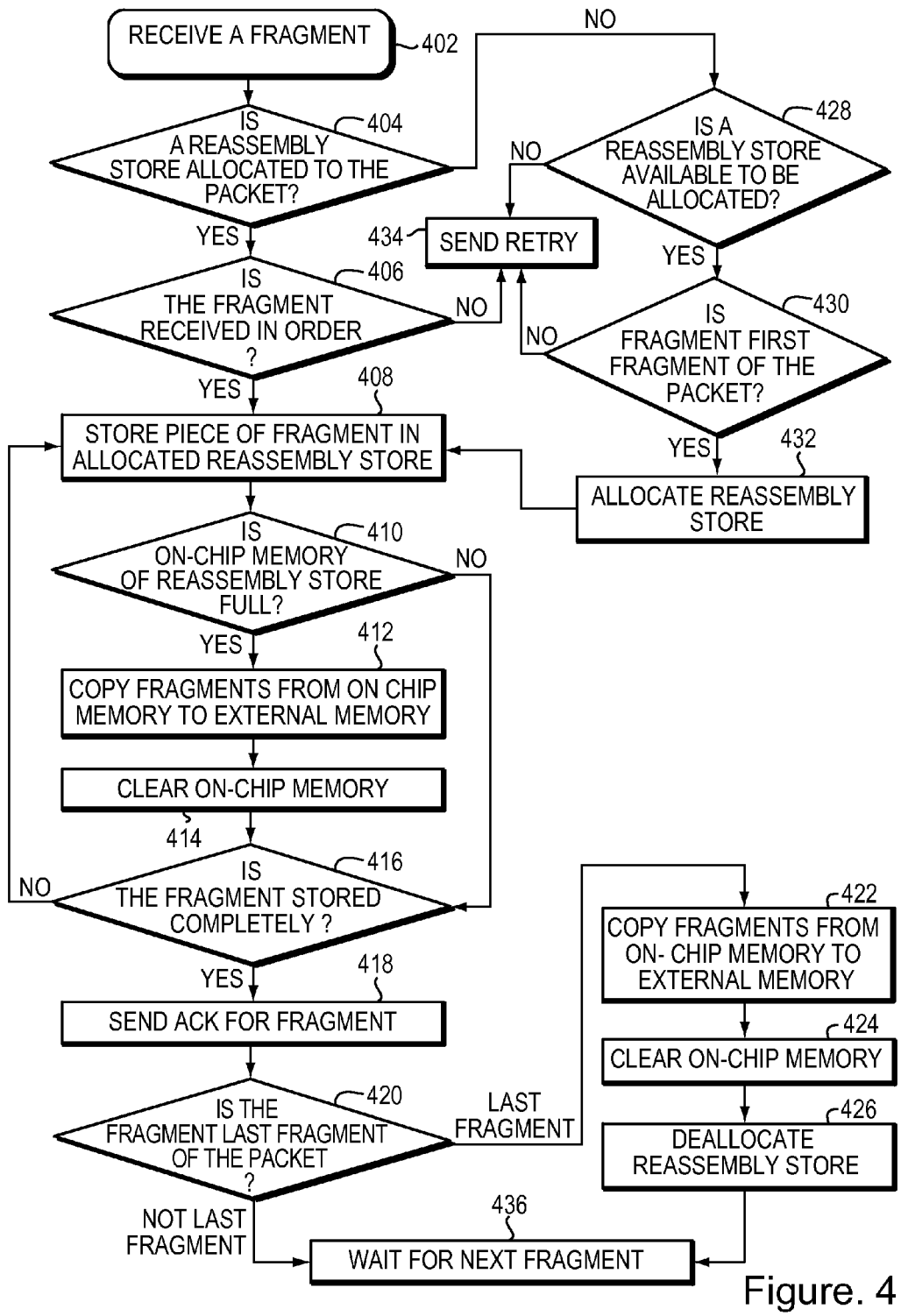
FIG. 4 is a flow diagram illustrating a process for receiving a particular fragment of a packet.

FIG. 4 is a flow diagram illustrating a process 400 for receiving a particular fragment of a packet. In one embodiment, in reference to FIG. 3C, the packet allocation unit 362 receives the particular fragment and executes the process 400. In reference to FIG. 4, first the packet allocation unit receives a fragment (402). The packet allocation unit determines whether a reassembly store has been allocated to the packet corresponding to the received fragment (404) by determining whether it has previously assigned a "reassembly ID" to the packet. If the packet allocation unit 362 has assigned a reassembly ID to the packet, then it has allocated a reassembly store for the packet. If the packet allocation unit 362 has not assigned a reassembly ID to the packet, then it has not allocated a reassembly store for the packet.

If a reassembly store is not allocated to the packet, the packet allocation unit 362 then determines whether a reassembly store is available to be allocated (428) by determining whether it can allocate a reassembly ID to the packet. In one embodiment, the packet allocation unit determines whether it can allocate a new reassembly ID to the packet by comparing the number of assigned reassembly IDs to a number of total available reassembly stores. If the number of assigned reassembly IDs is equal to the number of total available reassembly stores, the packet allocation unit determines it cannot allocate a reassembly ID. If the number of assigned reassembly IDs is less than the number of total available reassembly stores, the packet allocation unit determines it can allocate a reassembly ID.

If the packet allocation unit cannot allocate a reassembly ID to the packet, it sends a retry message (434). If the packet allocation unit can allocate a reassembly ID to the packet, it then determines whether the received fragment is the first fragment of the packet (430). If it is not the first fragment of the packet, the packet allocation unit sends a retry message (434) because the fragment is received out of order. If it is the first fragment of the packet, then the packet allocation unit allocates a reassembly store by assigning a reassembly ID to the packet (432). Then, the system stores a piece of the fragment in the newly allocated reassembly store (408).

If a reassembly store has already been allocated to the packet (404), the packet allocation unit determines if the fragment is received in order (406). If the fragment is not received in order, the packet allocation unit sends a retry message (434). If the packet is received in order, packet allocation unit stores a piece of the fragment in the allocated reassembly store (408). The piece of the fragment is stored in a memory chunk associated with the reassembly store on an on-chip memory. The memory chunks of the reassembly stores are each dynamically allocated to a reassembly ID representing a packet. In one embodiment, the piece of the fragment is 8-bytes and each reassembly store is a memory chunk of 128-bytes. Fragments are stored in pieces because fragments can vary in size. Fragments can be larger than the size of the memory chunk, in some instances.

After storing a piece of the fragment in an allocated reassembly store (408), the packet allocation unit determines whether the on-chip memory of the reassembly store is full by checking whether the memory chunk assigned to the reassembly store is full (410). The packet allocation unit determines if the 128-byte chunk of the on-chip memory allocated to the packet is full after storing the piece of the fragment. If the memory chunk is full, the packet allocation unit copies fragments and pieces of fragments from the on-chip memory to an external memory (412). Then, the packet allocation unit clears the memory chunk allocated to the reassembly store on the on-chip memory to store additional fragments and pieces of fragments (414). However, the packet allocation unit 362 does not deallocate the reassembly ID from the packet because the system continues to receive fragments from the packet. The packet continues to have a reassembly store allocated to it, even if the memory chunk allocated to it has been cleared, because the packet continues to have an assigned reassembly ID. The packet retains the reassembly ID until the entire packet is received.

Then, the packet allocation unit checks whether the entire fragment has been stored in the reassembly store, either in the on-chip memory, the external memory, or a combination of the on-chip memory and the external memory (418). If the entire fragment has not been stored, the packet allocation unit stores the next piece of the fragment in the allocated reassembly store (408). If the entire fragment has been stored, the packet allocation unit sends an acknowledgement of the fragment (418).

After sending an acknowledgment of the fragment (418), the packet allocation unit determines whether the fragment is the last fragment of the packet (420). When the fragment is the last fragment of the packet, the packet allocation unit copies the fragments from the on-chip memory to an external memory (422). Then, the packet allocation unit clears the on-chip memory (424). Last, the packet allocation unit deallocates the reassembly store by freeing the reassembly ID, so it can be used by another packet (426). At this point, the packet is received by the semiconductor chip and processed accordingly in a plurality of cores, in one embodiment. The packet allocation unit then waits to receive a next fragment from a new packet (436). If the fragment is not the last fragment, the packet allocation unit waits to receive the next fragment from the same packet (436).

Figure 5:
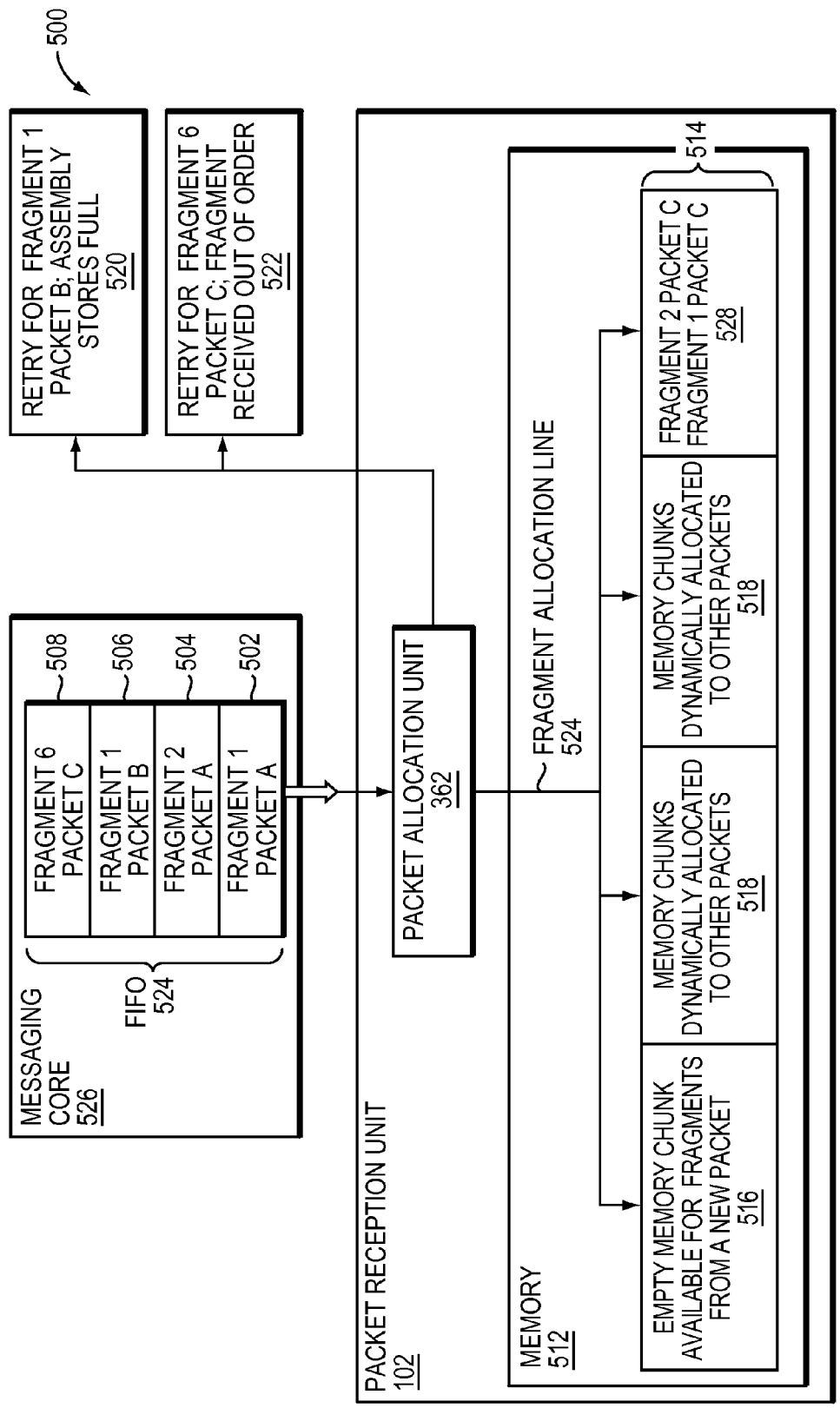
FIG. 5 is a block diagram of a system employing a packet reception unit including a packet allocation unit, illustrating an example of fragment reception.

FIG. 5 is a block diagram of a system employing a packet reception unit 102 including a packet allocation unit 362, illustrating an example of fragment reception. The packet allocation unit 362 is coupled to a memory 512 that stores fragments in reassembly stores 514 within the packet reception unit 102. The reassembly stores 514 are a collection individual reassembly stores. Each reassembly store includes a dynamically allocated memory chunk. In one embodiment, the memory chunk is 128-bytes. The packet reception unit 102 is also coupled with a messaging core 526. The messaging core includes a FIFO 524. The FIFO 524 receives and queues fragments from at least one source. Each source sends at least one packet to the packet reception unit 102.

In this example illustrating the function of the packet allocation unit 362, the FIFO 524 stores i) Fragment 1 of Packet A 502; ii) Fragment 2 of Packet A 504; iii) Fragment 1 of Packet B 506; and iv) Fragment 6 of Packet C 508 in the above recited order and directs them, in order, to the packet reception unit 102, which then directs them to the packet allocation unit 362.

The packet allocation unit 362 first processes Fragment 1 of Packet A 502. The packet allocation unit 362 first dynamically allocates a new reassembly ID for the new packet (Packet A). The packet allocation unit 362 then assigns the reassembly ID to the empty memory chunk 516, such that the memory chunk 516 stores fragments of Packet A. The packet allocation unit 362 then directs Fragment 1 of Packet A 502 to the empty memory store 516 over fragment storage line 524. A person of ordinary skill in the art can recognize that the number of memory chunks in the reassembly stores can be larger than the number of reassembly IDs.

A person of ordinary skill in the art can recognize that the empty memory chunk 516 can be allocated for fragments from any packet with a reassembly ID, not just packet A. In this example, the packet allocation unit 362 allocates the empty memory chunk 516 to Packet A because the packet has reassembly ID and the fragments of Packet A are the first to need the memory chunk 516. In other words, the empty memory chunk 516 is not dedicated only to Packet A, but rather is dynamically allocated to any packet that requires a memory chunk to store incoming packets, as long as the empty memory chunk 516 is empty at the time the packet is received and the packet is assigned a reassembly ID.

The packet allocation unit 362 then processes Fragment 2 of Packet A 504. The packet allocation unit 362 determines that the previously empty memory chunk 516 stores fragments of Packet A. The packet allocation unit 362 then stores Fragment 2 of Packet A 504 in memory chunk 516 over fragment storage line 524.

The packet allocation unit 362 then processes Fragment 1 of Packet B 506. In this example, no reassembly IDs are available for Packet B. The packet allocation unit 362 determines that no available reassembly stores 514 are available to receive a fragment from a new packet because a previously available reassembly ID is now allocated for Packet A and other reassembly IDs are available. The packet allocation unit 362 sends a retry message 520, optionally stating that the reassembly stores are full.

The packet allocation unit 362 then processes Fragment 6 of Packet C 508. The packet allocation unit 362 determines that allocated reassembly store 528 is allocated to Packet C, and that it contains Fragment 1 and Fragment 2 of a message of Packet C. The packet allocation unit 362 also determines that allocated reassembly store 528 does not contain Fragments 3-5 of Packet C, indicating that Fragment 6 of Packet C is out of order. The packet allocation unit 362 generates a retry message, optionally including that Fragment 6 of Packet C is received out of order.

Figure 6:
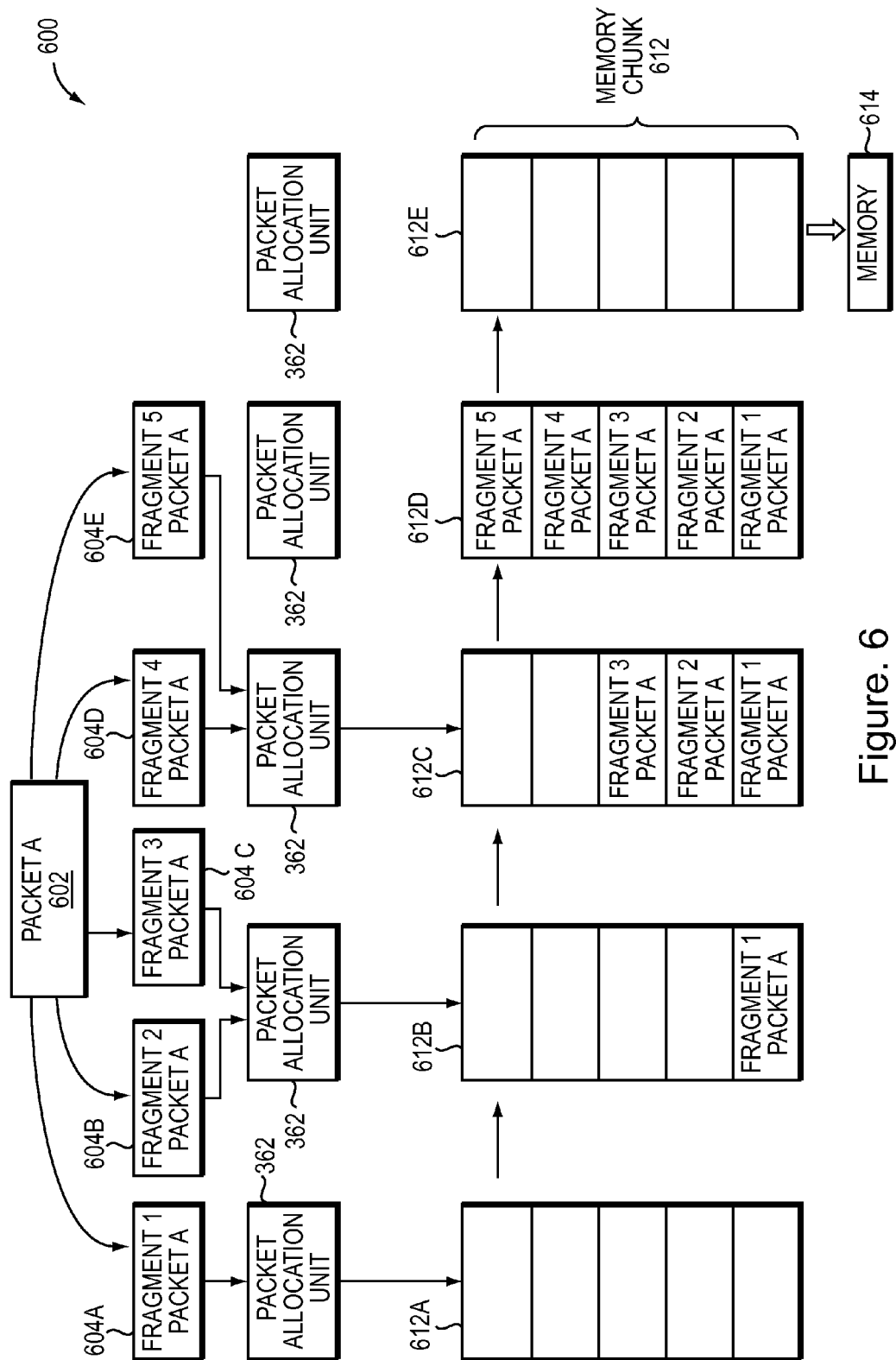
FIG. 6 is a block diagram illustrating a memory chunk of a reassembly store receiving fragments over time.

FIG. 6 is a block diagram illustrating a memory chunk 612 of a reassembly store receiving fragments 604A-E over time. Reassembly store memory chunk 612A-E illustrates the same memory chunk 612 in different states at different points of time. Packet A 602 is divided into five fragments 604A-E at a source (not shown). The packet allocation unit 362 first receives Fragment 1 604A. The packet allocation unit 362 allocates reassembly ID to Packet A 602, allocates empty memory chunk 612A to the reassembly ID, and then directs Fragment 1 604A to be stored in the memory chunk 612A of the reassembly store.

Next, the packet allocation unit 362 receives Fragment 2 604B and then Fragment 3 604C. Packet allocation unit 362 determines both Fragment 2 604B and Fragment 3 604C are part of Packet A from fragment header data and directs them to be stored in memory chunk 612B with Fragment 1 604A because Packet A has a reassembly ID associated with the memory chunk 612B.

Next, packet reassembly store 362 receives Fragment 4 604D and then Fragment 5 604E. Packet allocation unit 362 determines both Fragment 4 604D and Fragment 5 604E are part of Packet A from fragment header data and directs them to be stored in memory chunk 612C with Fragment 1 604A, Fragment 2 604B and Fragment 3 604C. The packet allocation unit 362 receives Fragments 2-5 of Packet A 604B-E in order after it receives Fragment 1 of Packet A 604A because Packet A has a reassembly ID associated with the memory chunk 612C.

At this point, memory chunk 612D is full. The memory chunk 612D then copies the five fragments 604A-E into external memory 614. External memory 614 is a memory external to the packet reception unit 102, and can be included on a semiconductor chip or an external memory to the semiconductor chip. After the memory chunk 612D copies the fragments 604A-E into memory, memory chunk 612E is cleared. The memory chunk 612E may then be used by any packet assigned a reassembly ID. In one embodiment, after the memory chunk 612E is cleared, it stores the same packet, i.e. packet A 602.

A multi-source/multi-destination retry protocol, in addition to receiving fragments and reassembling them as packets, can also transmit a packet as fragments. The packet has to be broken into multiple fragments and transmitted over a network.

Figure 7A:
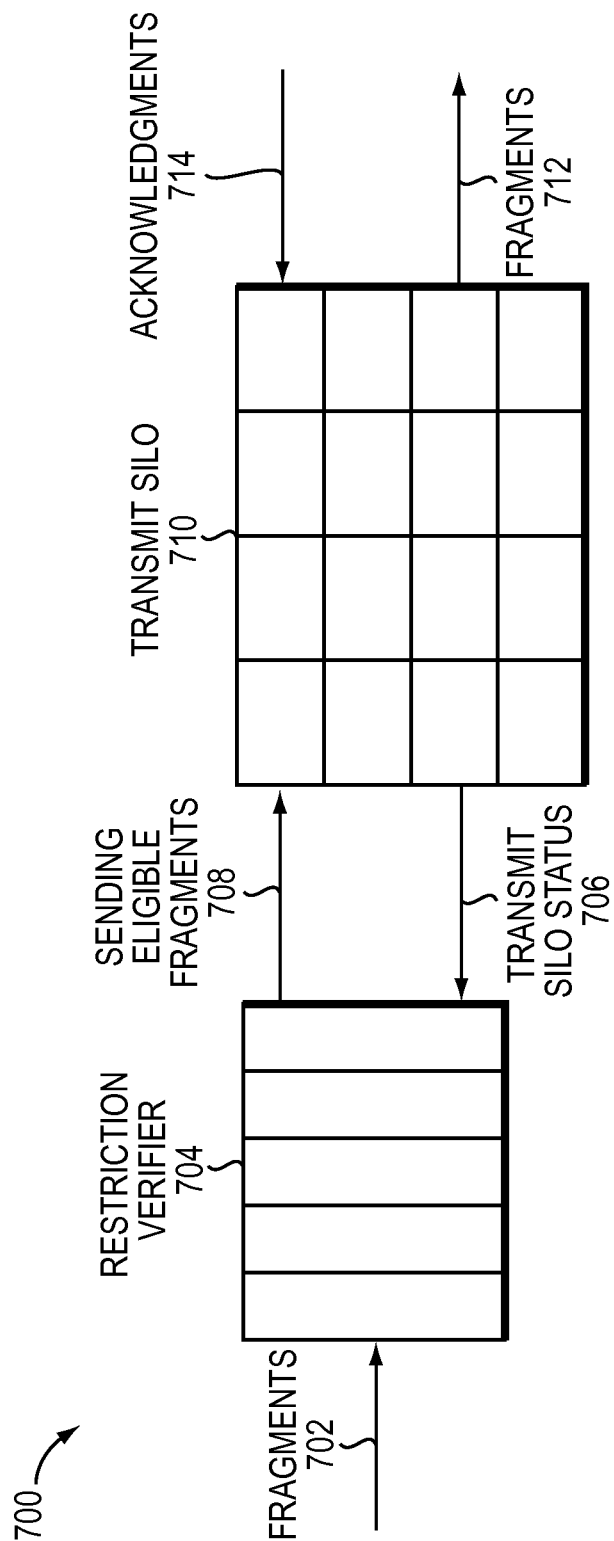
FIG. 7A is a block diagram of a system employed to send fragments over a network.

FIG. 7A is a block diagram 700 of a system employed to send fragments over a network. In one embodiment, the system is embodied in a semiconductor chip. A restriction verifier 704 receives and stores fragments 702 before sending eligible fragments 708 to the transmit silo 710. The transmit silo 710 sends a transmit silo status 706 to the restriction verifier 704. The transmit silo 710 receives a fragment and sends the fragment 712 to its destination. The transmit silo holds the sent fragment in its memory until it receives an acknowledgement 714 that the destination received the fragment. In this manner, the transmit silo determine whether a fragment has not been acknowledged and resend the fragment, and also prevent fragments 712 from being sent out of order, in combination with the restriction verifier 704. When the transmit silo 710 receives an acknowledgment 714 of a fragment, the transmit silo 710 deletes the fragment and updates the transmit silo status 706.

The restriction verifier 704 determines whether each particular fragment can be transmitted to and stored in the transmit silo 710. The restriction verifier 704 can be configured to limit: i) a number of outstanding fragments stored in the transmit silo 710; ii) a number of outstanding packets stored in the transmit silo 710; iii) a number of outstanding fragments per destination stored in the transmit silo 710; iv) a number of outstanding packets per destination stored in the transmit silo 710; v) a number of outstanding fragments per mailbox of the destination stored in the transmit silo 710; vi) a number of outstanding packets per mailbox of the destination stored in the transmit silo 710. In an embodiment where the transmit silo 710 is also coupled with a controller, the restriction verifier can further be configured to limit: vii) a number of outstanding packets per controller stored in the transmit silo 710, viii) a number of outstanding fragments per controller stored in the transmit silo 710; ix) a number of outstanding packets per destination per controller stored in the transmit silo 710; x) a number of outstanding fragments per destination per controller stored in the transmit silo 710; xi) a number of outstanding packets per mailbox of the destination per controller stored in the transmit silo 710; and xii) a number of outstanding fragments per mailbox of the destination per controller stored in the transmit silo 710. Based on one or more of these restrictions, the restriction verifier prevents the transmit silo from sending packets out of order.

Figure 7B:
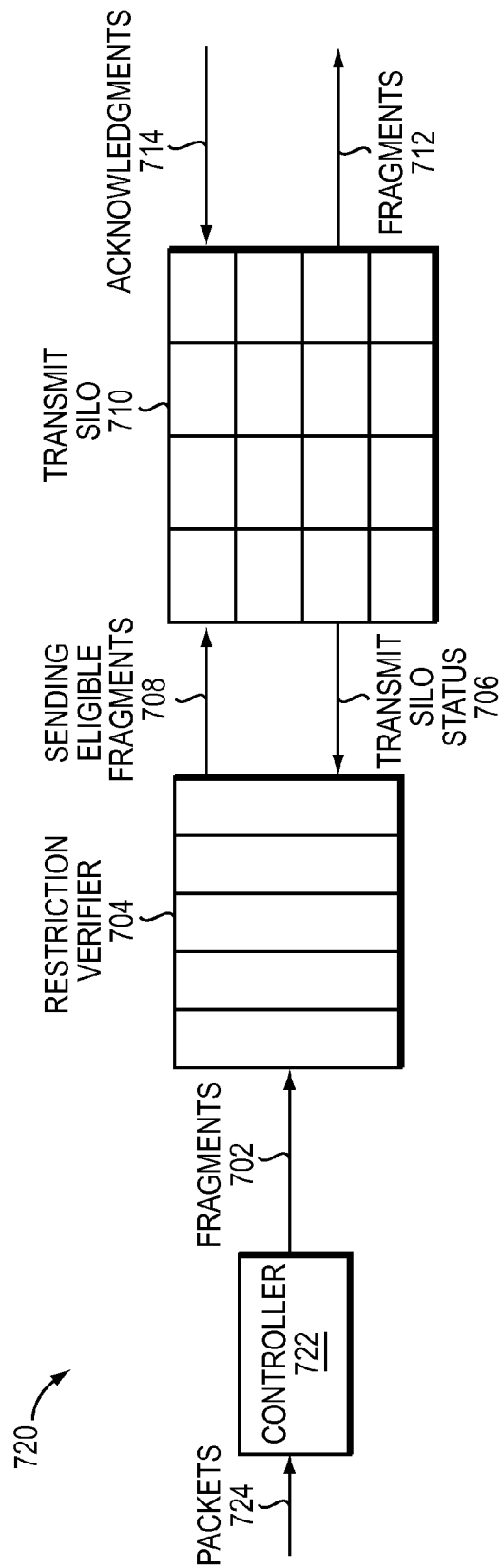
FIG. 7B is a block diagram of a system employed to send fragments over a network including a controller.

FIG. 7B is a block diagram 720 of a system employed to send fragments over a network including a controller 722. The controller 722 receives packets 724 and is configured to divide, or break-up, the packets 724 into multiple smaller fragments 702. The controller 722 sends the fragments 702 to the restriction verifier 704, which forwards the fragments 702 to the transmit silo when the fragments and transmit silo meet certain conditions, as described in reference to FIG. 7A.

Figure 7C:
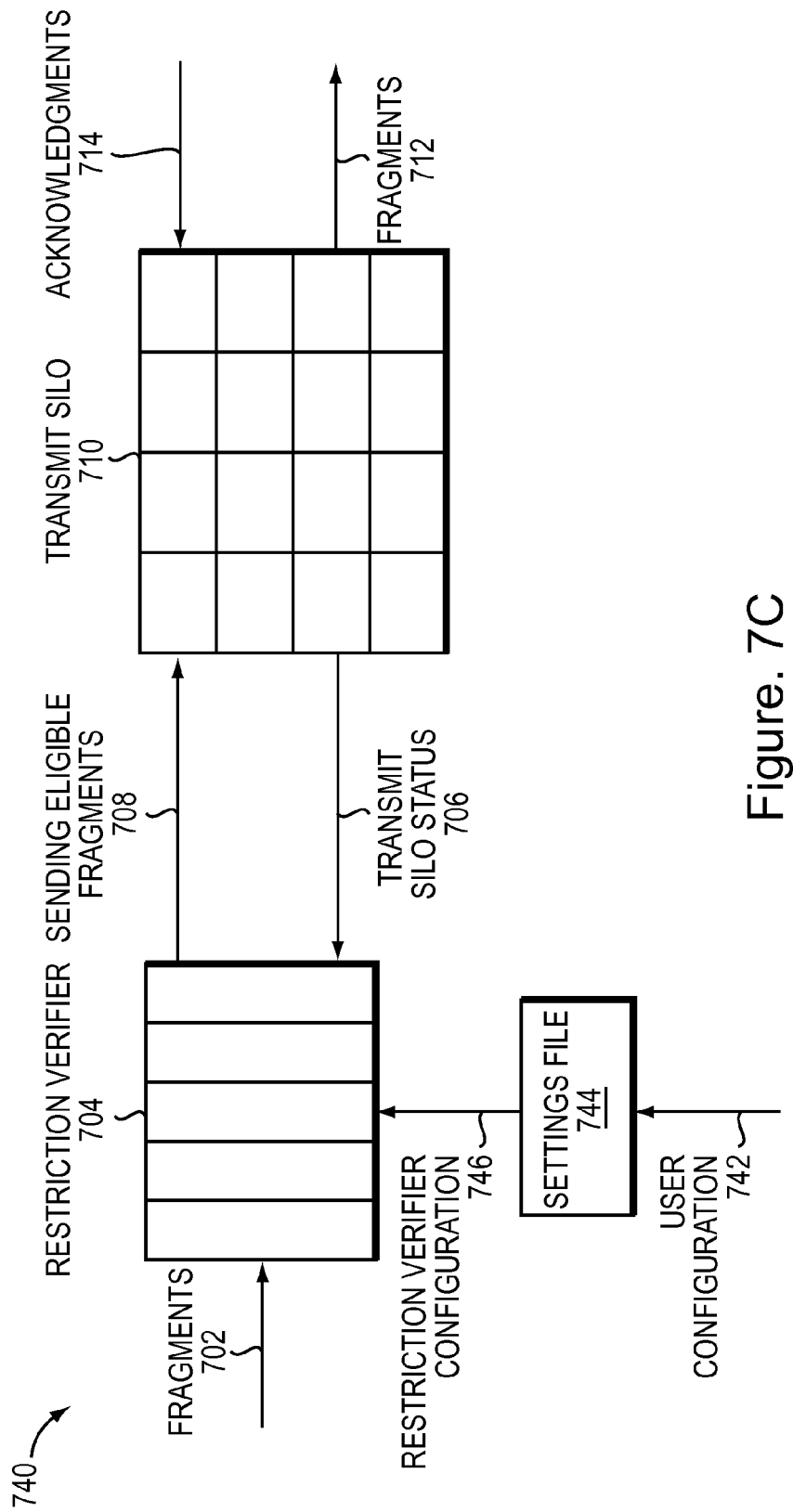
FIG. 7C is a block diagram of a system employed to send fragments over a network including a settings file.

FIG. 7C is a block diagram 740 of a system employed to send fragments over a network including a settings file 744. The settings file 744 receives and records user configuration 742. The settings file includes settings for any of the categories the restriction verifier is configured to limit, as described in reference to FIG. 7A. In reference to FIG. 7C, the settings file sends restriction verifier configuration 746 based on the settings file 744 to the restriction verifier 704. The restriction verifier 704, upon receiving the restriction verifier configuration 746, reconfigures itself to accommodate the updated settings file 744.

Figure 8:
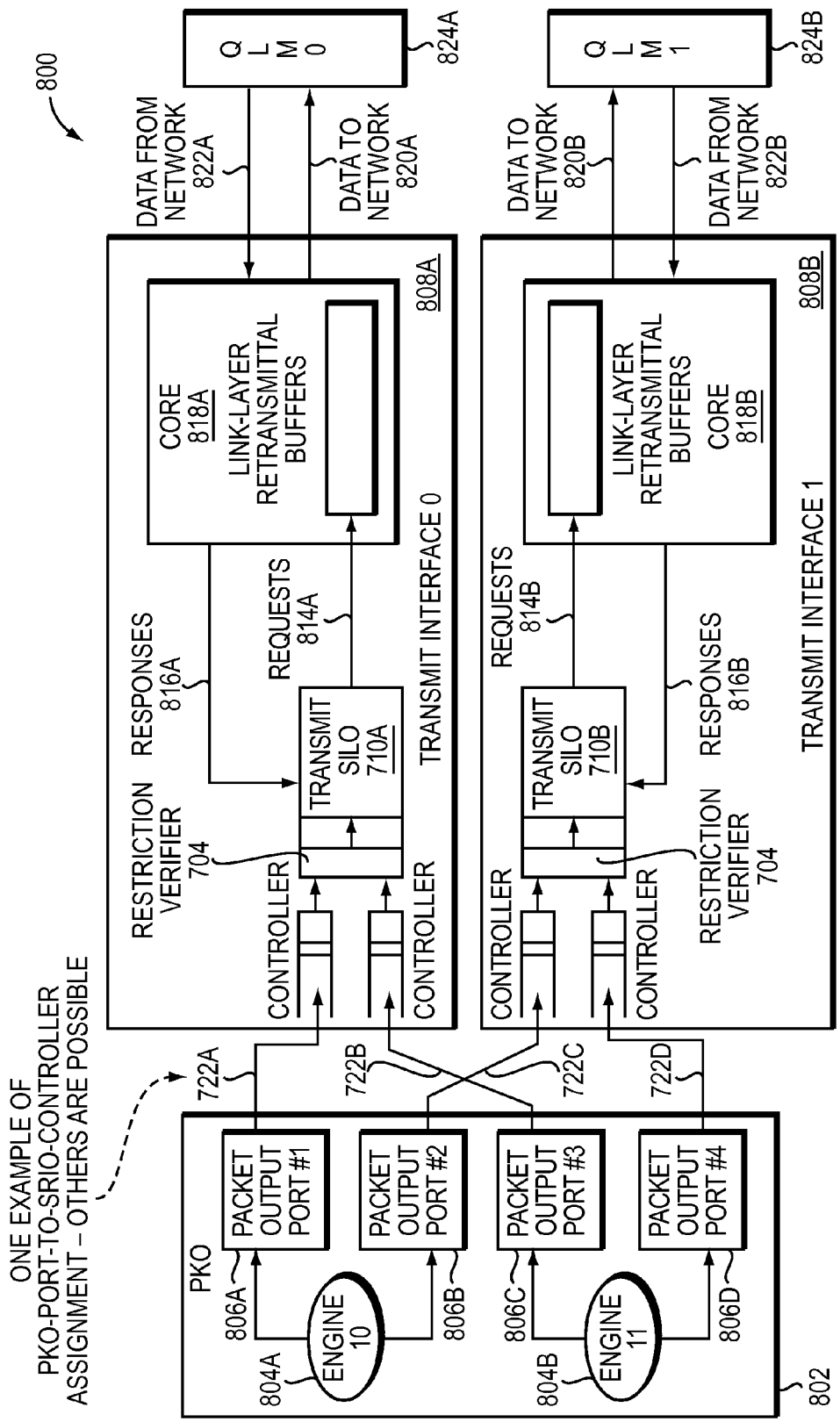
FIG. 8 is a block diagram of a system employed to transmit fragments after receiving packets from a packet output unit at a first and second transmit interface.

FIG. 8 is a block diagram of a system employed to transmit fragments after receiving packets from a packet output unit 802 at a first and second transmit interface 808A-B. In one embodiment, the packet output unit 802 is embodied in a semiconductor chip. The packet output unit 802 pushes packets to packet output ports 806A-D through a first and second packet engine 804A-B. A person of ordinary skill in the art can employ any number of packet engines 804 and packet output ports 806. The packet output ports 806A-D are coupled with the first transmit interface 808A and the second transmit interface 808B. FIG. 8 shows a first packet output port 806A and third packet output port 806C coupled to the first transmit interface 808A via first and third controllers 722A and 722C, respectively. FIG. 8 also shows a second packet output port 806B and fourth packet output port 806D coupled to the second transmit interface 808B via the second and fourth controller 722B and 722D, respectively. However, a person of ordinary skill in the art can recognize any configuration of the coupling of the packet output ports 806A-D to the transmit interfaces 808A-B is employable.

Focusing on the operation of the first transmit interface, the first and second controllers 722A and 722B receive packets from the packet output unit 802. A person of ordinary skill in the art can employ any number of controllers regardless of the number of restriction verifiers and transmit silos 710A. The controllers 722A-B break the received packets into fragments and forward them to the restriction verifier 704. The restriction verifier 704 determines, as described in reference to FIG. 7A, whether the fragments can be sent to the transmit silo 710A. If so, the restriction verifier 704 forwards the packet to the transmit silo 710A. The transmit silo issues a request to the transmit messaging core 818A to send the fragment. The transmit core transmits the fragment as data to network 820A to QLM 824A.

When the QLM receives an acknowledgement from the destination that the fragment has been received, the QLM transmits the acknowledgment to the transmit messaging core 818A as data from network 822A. The transmit messaging core 818A then sends the acknowledgment to the transmit silo 710A as responses 816A. The transmit silo 710A then deletes the fragment from its memory, freeing up a silo spot for another fragment.

A person of ordinary skill in the art can recognize that the second transmit interface 808B is similar in operation to the first transmit interface 808A.

Figure 9:
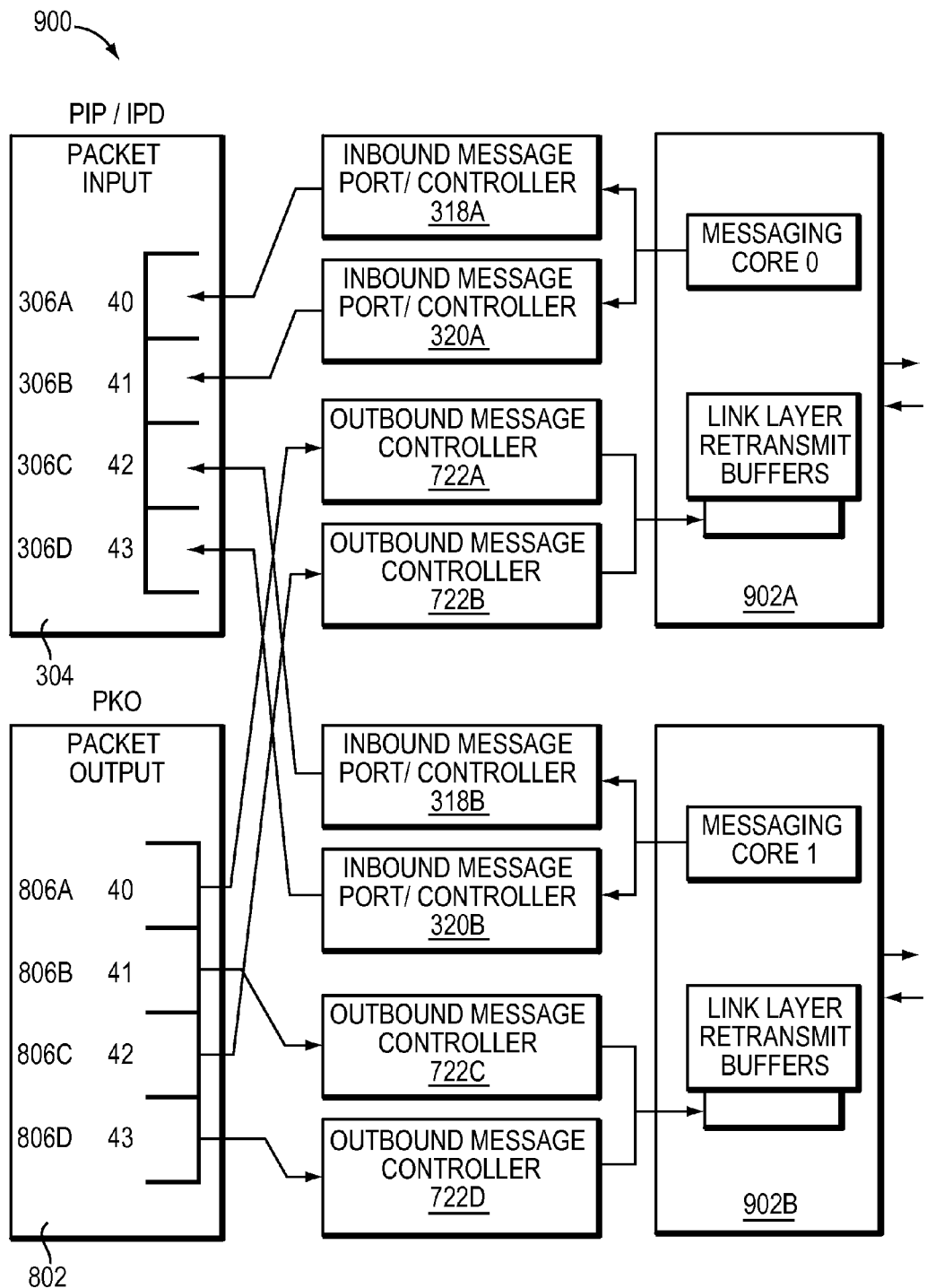
FIG. 9 is a block diagram of a system configured to embody both a transmit interface and a receiving interface.

A person of ordinary skill in the art can recognize that a transmit interface and a receiving interface can be useful if combined in the same system. FIG. 9 is a block diagram 900 of a system configured to embody both a transmit interface and receiving interface as described above. In one embodiment, the system is embodied in a semiconductor chip. The system includes the packet input unit 304 and the packet input ports 306A-D as described in reference to FIG. 3. The packet input ports 306A-D are coupled to receive data from inbound message ports 318A-B and 320A-B, respectively.

Referring to FIG. 9, the system further includes the packet output unit 802 and the packet output ports 806A-D, as described in reference to FIG. 8. The packet output ports 806A-D are coupled to output packets to outbound message controllers 722A-D, respectively, as described in reference to FIGS. 7 and 8.

Referring to FIG. 9, the system further includes multi-source/multi-destination retry interfaces 902A and 902B. The multi-source/multi-destination retry interfaces 902A and 902B are coupled with the inbound message ports 318A-B and 320A-B and packet output ports 722A-D. A person of ordinary skill in the art can couple the inbound message ports 318A-B and 320A-B and packet output ports 722A-D with the different multi-source/multi-destination retry interfaces 902A and 902B in any combination.

While this invention has been particularly shown and described with references to example embodiments thereof, it will be understood by those skilled in the art that various changes in form and details may be made therein without departing from the scope of the invention encompassed by the appended claims.

What is claimed is:

1. A system comprising:
   a plurality of reassembly stores configured to store at least one fragment of a packet in a particular reassembly store corresponding with the packet, and when the particular reassembly store contains at least one fragment of the packet representing the packet as a whole, forward the packet to a plurality of cores; and
   a packet reception unit configured to store the at least one fragment in one of a plurality of memories within the reassembly stores, and, when the one of the plurality of memories is filled, copy the at least one fragment to a memory external to the packet reception unit.

2. The system of claim 1, wherein the packet reception unit is further configured to receive a plurality of packets, wherein the packets may originate from more than one source.

3. The system of claim 1, wherein the particular reassembly store is allocated to the packet upon receiving a first of the at least one fragment of the packet.

4. The system of claim 3, wherein the particular reassembly store accepts other fragments of the at least one fragment of the packet after receiving the first of the at least one fragment of the packet.

5. The system of claim 1, wherein the packet reception unit is further configured to send a retry message when each of the reassembly stores are unavailable to receive a first of the at least one fragment of the packet.

6. The system of claim 1, wherein the packet reassembly stores are stored in a memory internal to the packet reception unit.

7. The system of claim 1, further comprising a packet allocation unit configured to direct each fragment associated with the packet to the particular reassembly store corresponding with the packet.

8. The system of claim 1, further comprising:
   at least one port within the packet reception unit;
   wherein each reassembly store is assigned to one of the ports.

9. The system of claim 8, wherein the reassembly store assignments to the ports are configurable to affect quality of service of each of the ports.

10. The system of claim 1, further comprising a plurality of packet reception units, each packet reception unit sharing the plurality of reassembly stores wherein each reassembly store is assigned to one of the packet reception units.

11. The system of claim 10, wherein the reassembly store assignments to the packet reception units are configurable to affect quality of service of each of the packet reception units.

12. A method comprising:
   storing at least one fragment of a packet in a particular one of a plurality of reassembly stores corresponding with the packet; and
   forwarding the packet to a plurality of cores when the particular reassembly store contains at least one fragment of the packet such that the stored at least one fragment represents the packet as a whole;
   storing the at least one fragment in one of a plurality of memories within the reassembly stores; and
   copying the at least one fragment to a memory external to a packet reception unit when the one of the plurality of memories is filled.

13. The method of claim 12, further comprising receiving a plurality of packets including the packet, wherein the packets originate from more than one source.

14. The method of claim 12, further comprising allocating the particular reassembly store to the packet upon receiving a first of the at least one fragment of the packet.

15. The method of claim 14, wherein the particular reassembly store accepts other fragments of the at least one fragment of the packet after receiving the first of the at least one fragment of the packet.

16. The method of claim 12, further comprising sending a retry message when each of the reassembly stores are unavailable to receive a first of the at least one fragment of the packet.

17. The method of claim 12, wherein the packet reassembly stores are stored in an internal memory.

18. The method of claim 12, further comprising directing each fragment associated with the packet to the particular reassembly store corresponding with the packet.

19. The method of claim 12, further comprising assigning each reassembly store to at least one port.

20. The method of claim 19, further comprising configuring the reassembly store assignments to the ports to affect quality of service of each of the ports.

21. The method of claim 12, further comprising sharing the plurality of reassembly stores with each of a plurality of packet reception units wherein each reassembly store is assigned to one of the packet reception units.

22. The method of claim 21, further comprising configuring the reassembly store assignments to the packet reception units to affect quality of service of each of the packet reception units.

* * * * *